Patented Apr. 22, 1941

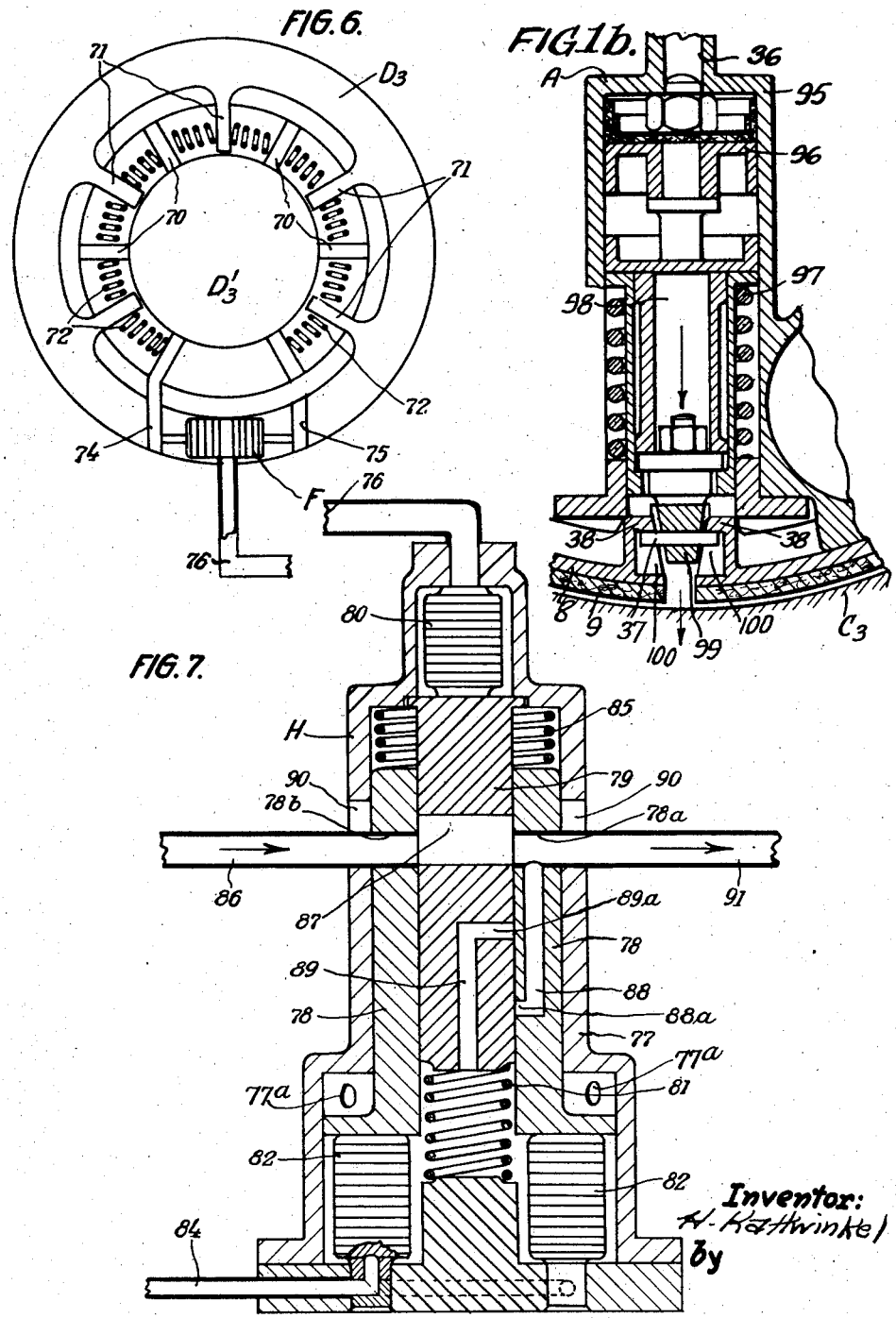

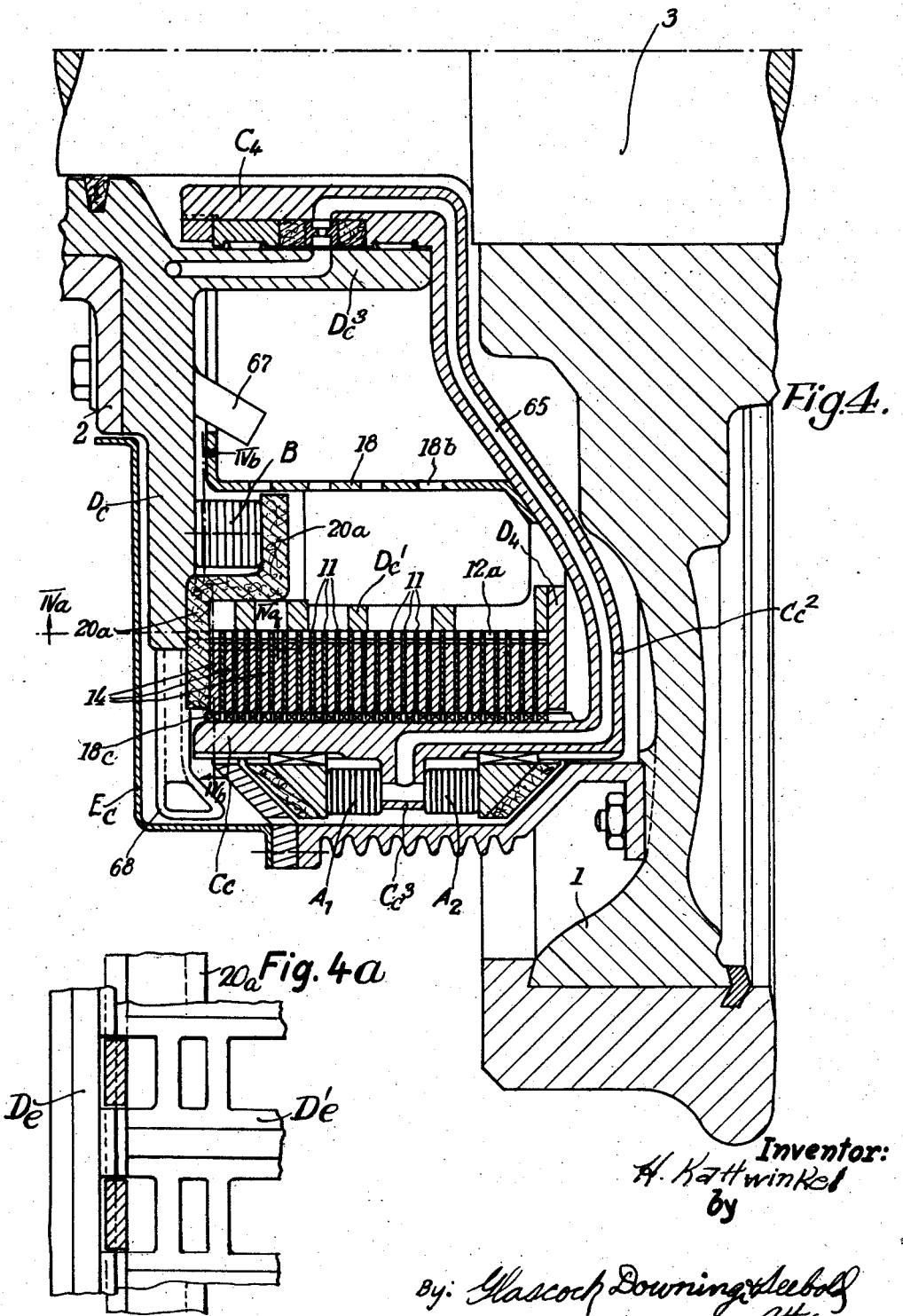

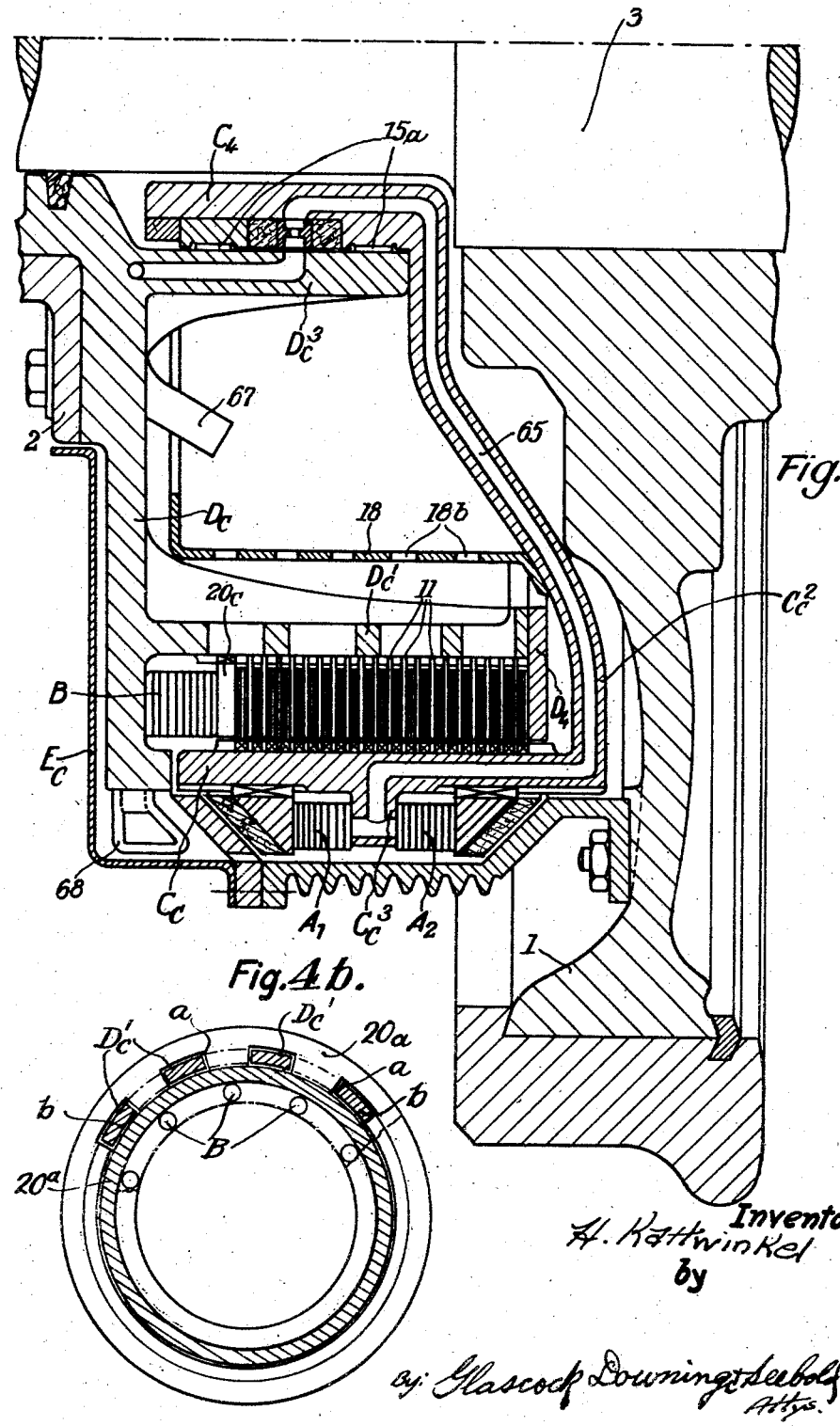

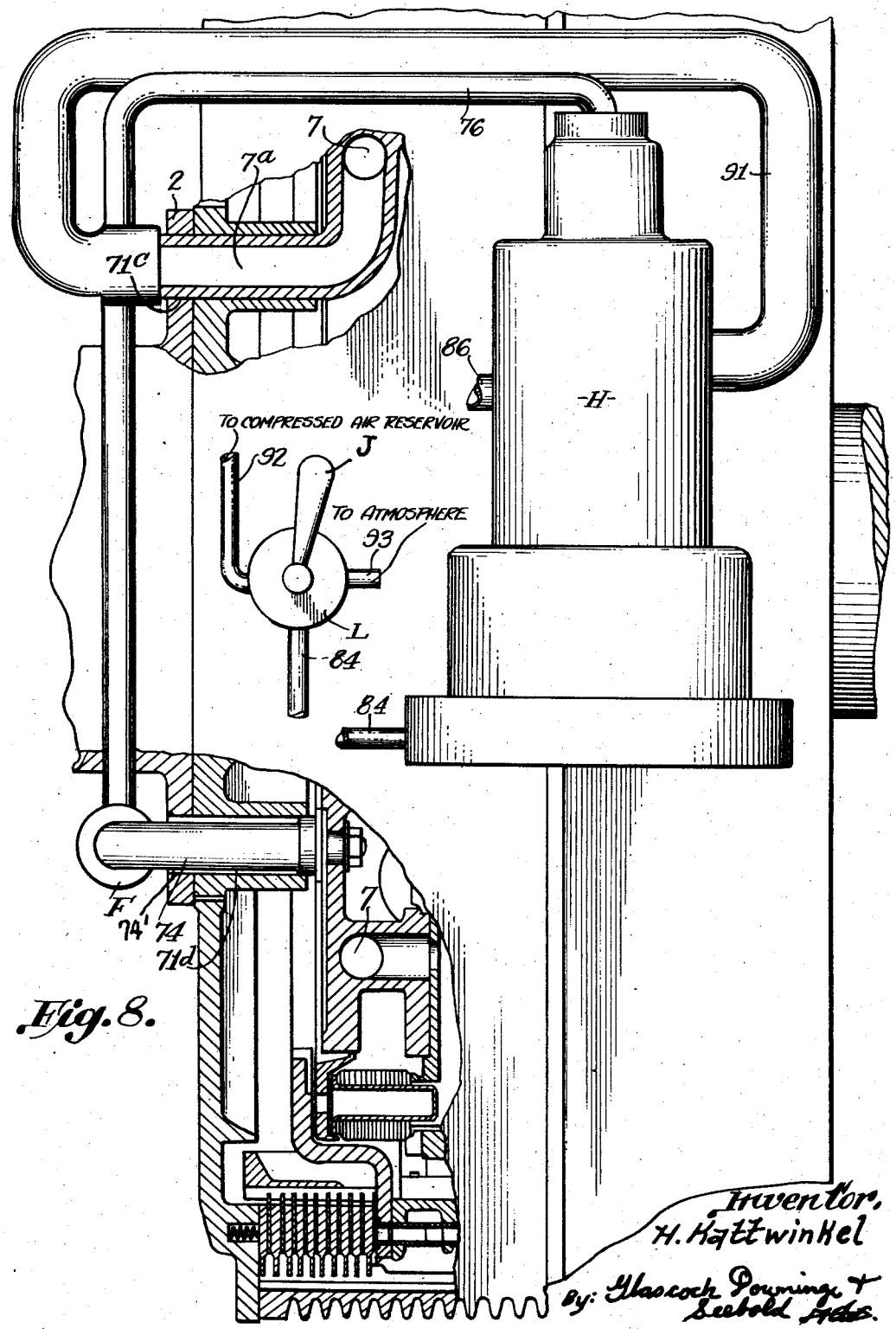

2,239,459

UNITED STATES PATENT OFFICE 2,239,459

MULTIPLE DISK BRAKE

Hans Kattwinkel, Radebeul, Germany

Application January 22, 1938, Serial No. 186,461
In Germany January 28, 1937

11 Claims. (Cl. 188—153)

My invention relates to that type of multiple disk brakes in which, as described in my pending application Ser. No. 72,809 of the 4th of April 1936, now Patent No. 2,148,818, Feb. 28, 1939, in combination with a very close adjacency of the friction disks that group of disks which is not directly or permanently connected to the axle or the like to be braked is in the neutral position of the brake allowed to rotate with the axle or the like, so that in the said neutral position of the brake losses due to friction are avoided and generation of injurious heat in the disks can no more occur, whereas the disks being not in direct or permanent connection with the axle or the like are only held fast shortly before the brake is applied and the disks have for this purpose been forcibly pressed together, the said holding fast of the one group of disks being effected by braking the carrier of these disks before the pressing together of the totality of disks.

The improvements and modifications which are the objects of my present invention relate mainly to the construction, mutual arrangement and supporting of the carriers of the friction disks.

One object of the invention is to provide the inner disk carrier with one or more annular bodies of stepped cross section, of which the outer flange portions bear on the packet or packets of friction disks, while the inner flange portions are opposite to the pressure devices acting in an axial direction, for the purpose of compressing the packet or packets of friction disks. Further objects and features of the invention will appear from the description of the invention which will now be given in connection with the accompanying drawings, in which Fig. 1 shows an embodiment of a railway carriage brake according to the invention in axial section through the lower half of the brake, Fig. 1b shows a section of a detail taken at right angles to that of Fig. 1, Figs. 2 to 4 illustrate axial sections through the lower halves of four modified embodiments of the brake according to the invention, Fig. 4a is an axial elevation, partly in section on the line IVa—IVa of Fig. 4, Fig. 4b is an end view of the brake shown in Fig. 4 on a reduced scale and partly in section on the line IVb—IVb of Fig. 4, Fig. 5 shows a further embodiment of the invention in axial section through the lower half of the brake.

Figures 6 and 7 are respectively an end view and a sectional view of a device for automatically regulating the torque in the embodiment illustrated in Figure 1.

Fig. 8 is a diagrammatic view showing the device illustrated in Figs. 6 and 7 connected up to the embodiment shown in Fig. 1.

Of course the brake devices illustrated, as such, may also be employed for other purposes, particularly where the braking of large and rapidly moving masses is important, as for instance in the case of heavy high-speed vehicles.

In Figures 1 to 5, 1 denotes the wheel of a railway vehicle, 2 denotes a member rigidly connected with the axle bearing or with the underframe of the vehicle, and 3 denotes the axle.

Figure 1:
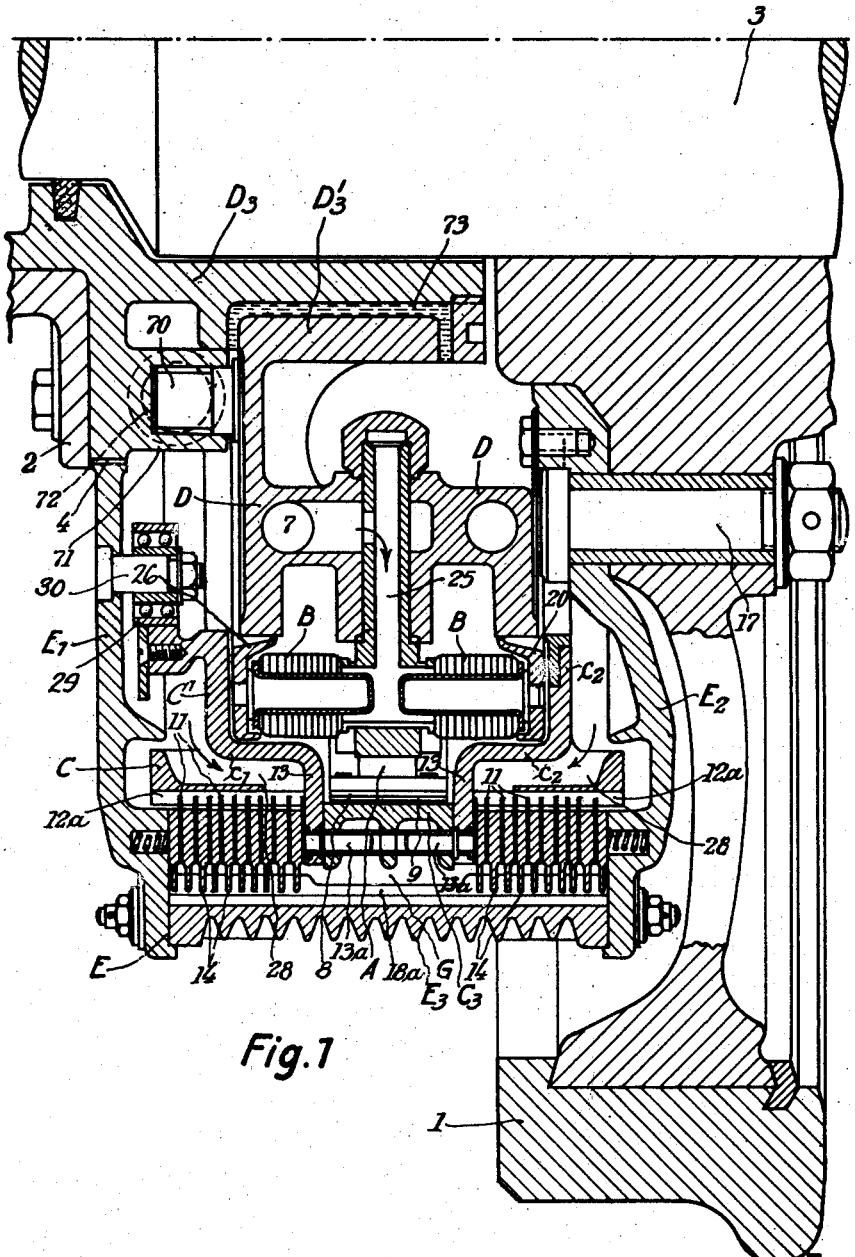

In the embodiment illustrated in Figure 1 there is secured to the wheel 1, by the aid of massive bolts 17, an annular hollow body which is denoted as a whole by E, and which is composed of three parts, namely the substantially disk-shaped end parts $E_1$, $E_2$, and an annular part $E_3$ connecting them with one another. These three parts form together an annular casing, which is closed, except for an annular gap 4 between the inner periphery of the disk portion $E_1$ and the hub $D_3$ of an annular body D, which is so connected with the part 2 of the axle bearing as to be rotatable only within certain limits. The body D forms the carrier of one group 14 of friction disks. The disks 14, which are arranged alternately with disks 11 in two packets separate from one another, are guided by ribs or ledges 18a, projecting from the internal surface of the middle part $E_3$ and extending in an axial direction, the disks 11 being guided upon similar ribs or ledges 12a, which project outwards from the second disk carrier C. This carrier, which will hereinafter be referred to as the loose carrier, is rotatable without limit both in relation to the wheel 3 and in relation to the axle bearing 2, and therefore in relation to the vehicle underframe 3. The loose carrier may be supported by the aid of running rollers distributed around its periphery, on the outer or fixed carrier E, and the running rollers supporting the two disk carriers being mounted by means of ball bearings 29 or studs 30 fixed on the disk-shaped parts $E_1$, $E_2$, of the carrier E so as to extend axially inwards.

The loose carrier, denoted as a whole by the reference C, is likewise composed of a central annular portion $C_3$ and two side members $C_1$ and $C_2$. The last-named parts, which also comprise ledges or ribs 12a for guiding the disks 11, are of stepped cross section, which is symmetrical about a central plane at right angles to the axle 3, and are guided on the central part $C_3$ by their outer flange members 13 by the aid of bolts 13a, in such a way that they can slide axially in relation to the latter but cannot rotate. Opposite to the inner flange members $c_1$, $c_2$ of the loose carrier C are located pressure appliances B, which effect the compression of the packets of disks in an axial direction. The pressure appliances B are distributed in pairs opposite to one another over the periphery of the annular body D connected with the axle bearing 2. They consist of hollow cylindical bellows of thin sheet metal, the interiors of which communicate by a common pipe 25 with a supply 7 for the pressure fluid, for instance compressed air. The bellows B do not act directly upon the flange members $c_1$, $c_2$ but through the medium of annular disks 20, which are so guided, by the aid of bolts mounted on the carrying body D and extending in an axial direction, that they can slide axially but cannot rotate relatively to the carrying body D.

Upon the periphery of the carrying body D are arranged pressure appliances A, which consist of pistons 96 operating in cylinders 95 communicating with the pressure medium, for instance compressed air through pipes 36.

The pistons are urged towards the axle by means of springs 97. At the free end of the piston rod 98, a wedge 99 is provided which passes between two projections 100, 100 having correspondingly inclined surfaces on the brake blocks 8, 8 which are in the form of annular sectors. These brake blocks are provided with friction pieces 9, 9, also in the form of annular sectors. When the pistons 96 are forced outwardly in the direction of the arrow by the introduction of pressure medium into the cylinders 95, thereby expanding the brake blocks 8, the friction pieces come into frictional engagement with co-operating friction surfaces on an annular central part $C_3$ of the loose disk carrier C, whereby the braking of the loose disk carrier is effected. If the connection of the cylinders 95 with the source of pressure medium is interrupted and the pipes 36 placed into communication with the atmosphere, then the springs 97 force the pistons 96 back into their initial position, the brake blocks being retracted through the intermediary of pins 37 which pass through the wedges 99 which bear against projections 38 on lugs provided on the brake blocks. The braking of the loose carrier is effected shortly before the pressure appliances formed by the bellows B come into operation for the compression of the packets of friction disks, and independently of the latter. For this purpose the compressed air ducts leading to the pressure appliances A and to the pressure appliances B lead independently of one another through the carrying body D and the axle bearing 2 to a control appliance supervised by the driver of the vehicle. By a further pipe, not shown in the drawings, a cooling medium is supplied to the friction disks, this cooling medium following the paths indicated by the two arrows, through two groups of ducts 28 distributed over the periphery in the side members $C_1$, $C_2$ of the loose carrier.

The operation of the arrangement is as follows:

If braking is to be effected, then in the first place compressed air is passed into the cylinder 95 through the pipes 36. By this means, as above described, the loose carrier C which has hitherto been rotating with the wheel 1 is braked and brought to a standstill. Directly after this compressed fluid is admitted into the bellows appliances B through the pipes 7, 25. The appliances B thereby expand and through the intermediary of the disks 20c compress the sets of disks 11, 14 together, whereby the wheel 1 is braked. If the braking action is to be interrupted, then the compressed fluid is first of all allowed to escape from the bellows appliances B and, following this, from the cylinder 95. By this means the wheel 1 and then the loose disk carrier C is allowed to run freely again.

Figure 2:
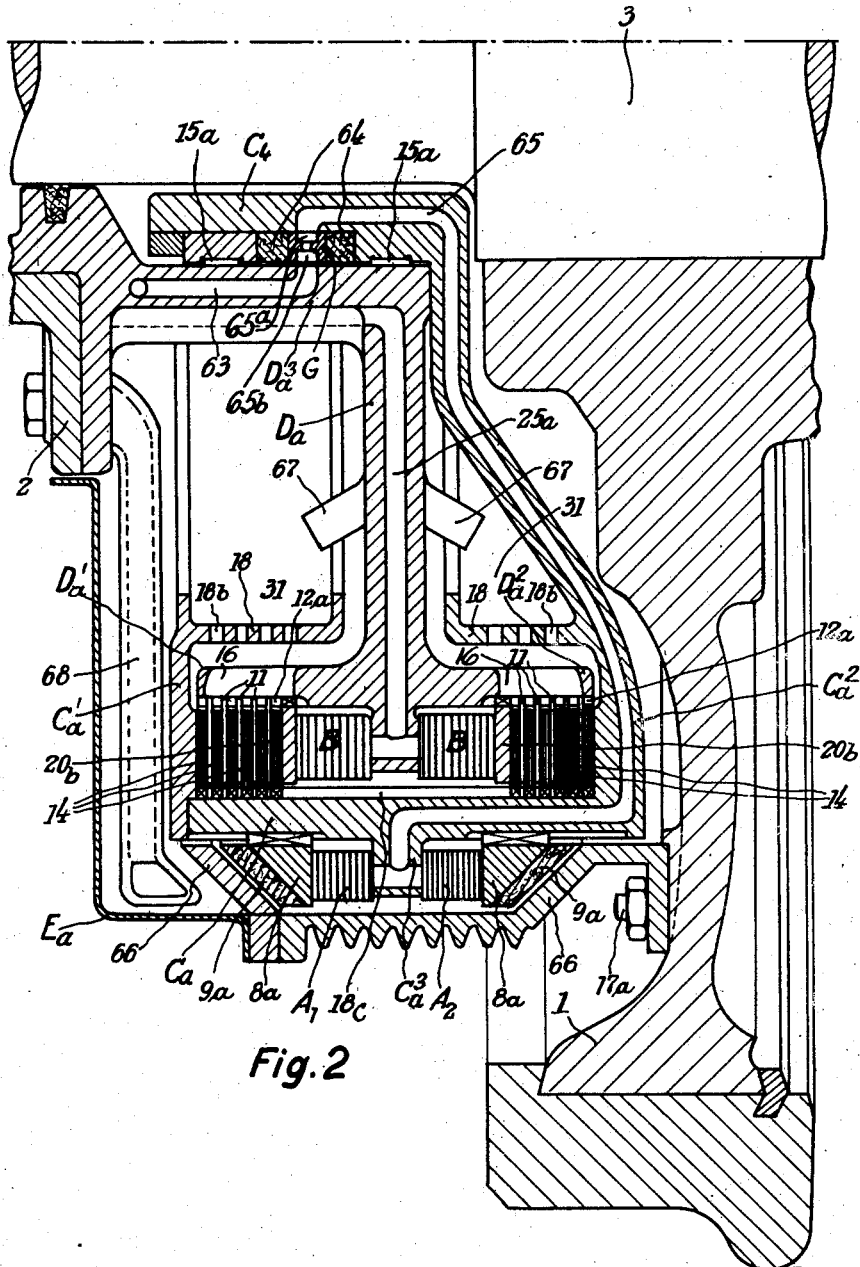

In the embodiment illustrated in Figure 2, the member Ea connected with the wheel 1 by bolts 17a is not at the same time the friction disk carrier. Instead of this it serves merely as a casing for the loose carrier Ca and for the fixed carrier rigidly united to the carrying body Da. The loose carrier, which may again be regarded as being composed of two lateral disk members $Ca^1$, $Ca^2$ and an annular central portion $Ca^3$, is supported, in the case illustrated, on the hub portion $Da^3$ of the central annular carrying body Da, rigidly connected with the axle bearing 2, this support being provided by the aid of needle bearings 15a, the running surfaces of which are provided in a hollow cylindrical hub portion $C_4$ of the loose carrier surrounding the axle 3. The form of construction illustrated is however to be preferred, firstly because in this case during normal operation the bearing positions are stationary, and relative rotation between the loose carrier and its supporting body only occurs during the braking, and secondly because for the purpose of supplying the pressure fluid for actuating the brake that holds fast the loose carrier, the axle 3 need not be bored through. As Figure 2 shows, the pressure medium is taken instead from a pipe 63 provided in the hub portion $Da^3$ of the carrying body Da, from which pipe it passes through an annular body G provided with two annular conduits 65a, 65b open to the outside and inside between two packing rings 64 into one or more ducts 65, which supply it to the pressure appliances $A_1$, $A_2$ fitted to an annular projection of the central part $Ca^3$ of the loose carrier. These pressure appliances, like the pressure appliances B of Figure 1, consist of two groups of bellows arranged opposite to one another in pairs, each of which co-operates with an annular body 8a of triangular cross section for example. These annular bodies are axially displaceable on the external periphery of the loose carrier Ca relatively to the latter, but are not rotatable thereon, being guided by the aid of ledges or ribs similar to the ledges or ribs 12a of Figure 1, extending in an axial direction. The pressure rings 8a are provided with annular friction coverings 9a, which, when the bellows $A_1$, $A_2$ are set in operation by admitting the pressure fluid to the interior thereof, bear against the oppositely located and correspondingly oblique friction surfaces of the wall members 66 of the casing Ea, as a result of which the coupling of the loose carrier to the wheel 1 is effected. This coupling takes place, as in the case of the constructional form illustrated in Figure 1, shortly before the packets of the friction disks 11 and 14 are compressed, which in its turn is effected by the aid of pressure appliances B, which consist, as in the case of the example shown in Figure 1 of groups of bellows located opposite to one another in pairs, which are secured to the central carrying body Da, and to which the pressure fluid is again supplied through a pipe 25a, which passes through the carrying body D and the axle bearing 2 to the appropriate controlling apparatus. The disks 14 are displaceable in an axial direction but not rotatable upon ledges 18c on the loose carrier C, and the other disks 11 upon ledges 12a on the fixed carrier formed by annular members $Da^1$, $Da^2$ projecting laterally from the carrier body Da.

Through pipes indicated at 67 starting from the carrying body Da the cooling medium is supplied to the friction disks. The pipes 67 are connected to a system of ducts provided inside the carrying body Da and inside the axle bearing 2 connected therewith. The cooling medium flows into annular cavities 31 on both sides of the body Da, closed by the wall portions 18 of the loose carrier, and from here through ducts 18b provided in the walls 18 and through larger gaps 16, 16 in the opposite ring portions $Da^1$, $Da^2$, to the insides of the packets of disks 11 and 14. The cooling medium then accumulates in the internal periphery of the casing Ea. It is here drawn up by a collecting pipe 68, and conveyed outwards through a passage provided inside the bearing body 2. The circulating of the cooling medium takes place automatically under the action of centrifugal force, no circulating pump being required.

It is also to be observed that the pressure rings 20b are guided between the bellows B and the packets of disks by the ledges 12a of the side members $Da^1$, $Da^2$ of the carrying body Da, which ledges receive the inner disks 11.

The mode of operation of the braking arrangement shown in Fig. 2 is as follows: When braking is to be effected, pressure medium is first of all admitted through the pipe 65 into the bellows $A_1$, $A_2$ which consequently expand and force the friction surfaces 9a against the co-operating friction surfaces 66 of the casing E. By this means the loose carrier Ca is coupled to the casing E and also with the wheel 1. Then, the pressure medium is admitted through the pipes 25a to the bellows B, whereby the packets of disks 11, 14 are compressed together and the braking of the wheel takes place. On releasing the brake the pressure medium is again first of all allowed to escape from the bellows B and then from the bellows $A_1$, $A_2$.

The cooling medium is admitted through the pipes 67 into the space 31 and under the action of centrifugal force passes through the ducts 18b in the wall portions 18 into the spaces 16 and from there to the packets of disks and through the latter into the hollow space formed by the casing Ea, in which the cooling medium under the action of centrifugal force forms a fluid ring which adheres to the cylindrical surface of the casing Ea. In this ring the collecting pipe 68 dips, the outer end of which is curved in the direction opposite to the direction of rotation of the wheel 1, so that the cooling fluid is driven into the pipe 68. The cooling fluid flows through the pipe 68 to a container arranged on the vehicle (not shown) and from which it is supplied again for example by means of a pump (not shown) and the supply pipe 67.

Figure 3:
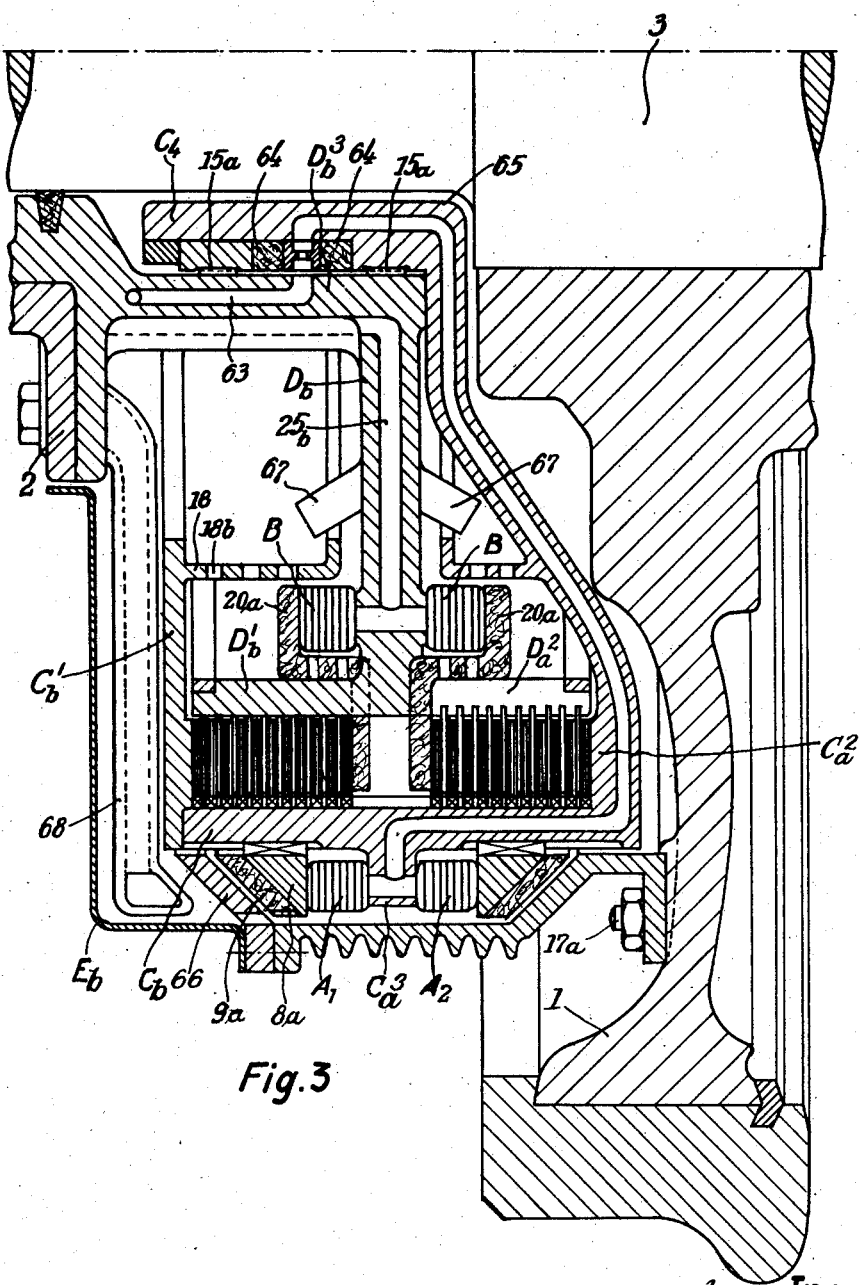

The embodiment illustrated in Figure 3 corresponds in general to the foregoing. There is a difference however in so far as the pressure bellows B, with a view to diminishing the over-all axial length of the coupling, are arranged not between the packets of disks but radially within the latter, and that consequently the pressure rings 20a, which transmit the axial displacement of the bellows B to the packets of disks, are of stepped cross section. They extend with their outer flange members, which bear on the inner sides of the packets of disks, through the side members $Db^1$, $Db^2$ of the carrying body Db, which are provided with suitable notches and form the stationary or fixed friction disk carrier.

The mode of operation is the same as in the case of the constructional form shown in Fig. 2, except for this difference that the bellows B act on the packets of disks through the intermediary of the pressure rings 20a of stepped cross-section.

The embodiments illustrated in Figures 4 and 5 are distinguished from those already described mainly by the feature that the friction disks are not arranged in two packets one on each side of a central plane located at right angles to the axis, but form a unitary packet. Accordingly the loose carrier Cc, as well as the carrying body Dc rigidly connected with the axle bearing 2, are one-sidedly constructed, and, moreover, of the bellows B effecting the axial compression of the packet of disks, only one group is provided. The loose carrier Cc, as in Figures 2 and 3, is supported on the hub body $Dc^3$, which here forms a hollow cylinder projecting on one side. For the rest it is constructed substantially in the manner described, particularly as regards the construction and arrangement of the pressure appliances $A_1$, $A_2$, but it has no abutments for the packet of disks. The abutments are provided on the fixed carrier $Dc^1$ instead.

The fixed carrier $Dc^1$, in the construction according to Figure 4, constitutes an annular body, which projects axially towards the wheel 1 and is rigidly connected at its left-hand end with the disk-shaped carrying body Dc, by means of screws and which has, on the side facing the wheel, an abutment flange $D_4$, and on its periphery the usual ledges or ribs 12a for guiding the disks 11, while the co-acting disks 14 are guided on corresponding ledges or ribs 18c on the loose carrier Cc. The pressure ring 20c transmitting the axial pressure from the bellows B to the packet of disks is again of stepped cross section, as in the embodiment illustrated in Figure 3, so that the bellows B are accommodated inside the packet of disks. The outer flange of the pressure ring 20c is provided with a series of openings a distributed over its periphery (Fig. 4b) into which extend teeth or fingers b which project from the fixed carrier $Dc^1$. In this manner the pressure ring 20a is guided on the fixed carrier $Dc^1$ in such a manner that it can displace itself axially with respect to the carrier but cannot rotate relatively to it. In order to make room for the pressure ring 20a in its outermost, left-hand position shown in Fig. 4, the disk body Dc is provided, opposite the left-hand flange of the pressure ring 20a with an annular recess c. In other respects the construction and the method of working are substantially the same as in the embodiments previously described.

The form of construction illustrated in Figure 5 mainly differs from that of Figure 4 merely by the fact that the pressure ring 20d is not of stepped cross section, and is located immediately between the packet of disks and the pressure appliances B. This construction is advisable when it is less important to keep the overall axial length small, but space is to be economised in a radial direction.

The mode of operation of the constructional forms shown in Figs. 4 and 5 is substantially the same as in the case of the constructional form shown in Fig. 2. If braking is to be effected, then to start with the pressure fluid is admitted through the pipe 65 to the bellows $A_1$, $A_2$, whereby the loose carrier $C_c$, $C_d$, respectively is coupled to the wheel 1. Then pressure medium is admitted to the bellows B which compress the packets of disks 11, 14 together, in the case of the construction shown in Fig. 4, through the intermediary of the stepped disk 20c and in the case of the construction shown in Fig. 5 through the intermediary of the annular disk 20d, thereby producing the braking action. The supply of pressure fluid to the bellows B is not shown in Figs. 4 and 5 but is effected as in the case of the constructions shown in Figs. 2 and 3 by means of ducts provided inside the body $D_c$, $D_d$ respectively. The cooling fluid is again supplied through the pipes 67 and conveyed away through the scoop tube 68.

It has already been indicated above, in describing the construction according to Figure 1, that the annular body D is rotatable to a certain limited extent relatively to the axle bearing member 2. This is rendered possible by the fact that the part $D'_3$ of the hub is supported for instance by means of a bronze bush 73 upon the sleeve member $D_3$ and is provided with pins 70 projecting axially and distributed round the periphery, these pins alternating with a corresponding number of stops 71, likewise distributed round the periphery, on the flange, screwed to the axle bearing member 2, of the sleeve body $D_3$. Between each pin 70 and the adjacent stop 71 is interposed, as indicated in a more diagrammatic manner by Figure 6, a helical spring 72. These springs oppose a resilient resistance to a rotation of the part $D'_3$ of the carrying body in relation to the part $D_3$ connected with the axle bearing, and ultimately restrict such rotation definitely when they are fully compressed. At one place on the periphery there is provided, between two outwardly extending arms 74 and 75 connected on the one hand with the body $D'_3$ and on the other hand with the body $D_3$, a pressure appliance F consisting of spring sheet metal bellows, the hollow interior of which is in communication by a flexible pipe 76 with a controlling appliance H mounted on the underframe of the car.

One arm 74 comprises a stud screwed into the annular body D and passing through an arcuate slot 74' in the bearing part 2 and through an arcuate slot 71d in the stop 71 adjacent thereto. This stud at its outer part forms an abutment for a pressure device F (Figs. 6 and 7) which consists of a resilient sheet metal bellows, the other abutment of which is formed by the arm 75 rigidly connected to the body $D_3$.

The controlling appliance consists essentially of a three-stage cylinder member 77, in which there work two piston valves, namely an outer annular piston 78 and an inner piston 79. The latter is subject to the action of a bellows 80, which is connected with the pipe 76, and which, when it expands owing to a rise of air pressure in the pipe 76 caused by compression of the bellows F (Fig. 1), presses the piston 79 downwards against the action of a spring 81, which urges it upwards. The piston 78 is subject on one side to the action of bellows 82, the interior of which communicates by a pipe 84 with the brake switch on the driver's switch board, and on the other side to the action of a spring 85, which tends to move the piston in the opposite direction.

To bores 78a and 78b of the piston 78 are connected flexible pipes 91 and 86 respectively, of which the latter comes from the source of compressed air, while the pipe 91 leads to the bellows B of the brake, which effect the axial compression of the packets of disks. The pipes 86 and 91 pass freely through elongated holes 90 provided in the wall of the cylinder 77. The inner piston 79 is provided with a transverse bore 87, which is of greater diameter than the bores 78a and 78b located opposite to it in the outer piston 78. The piston 79 also has a bore 89, the axially directed portion of which opens freely into the interior of the cylinder 77, which in its turn through openings 77a communicates with the atmosphere. The horizontal portion 89a of this bore opens in the peripheral surface of the piston. It may register in a definite relative position of the pistons 78 and 79 with the horizontal portion 88a of a bore provided in the piston 78, this bore terminating in the bore 78a or in the pipe 91 connected thereto. The pipe 91 is flexible and is attached to a hollow projection 7a forming a continuation of the supply conduit 7 and passing through an arcuate slot 71c in the bearing part 2 and a corresponding arcuate slot in the stop 71 adjacent thereto, the said slots being of sufficient length to permit the requisite amount of relative movement between the parts D and $D_3$.

The device illustrated in Figures 6 and 7 is designed to solve the following problem: The driver of a railway vehicle equipped with the brakes described adjusts the pressure in the bellows B, by the aid of a controlling appliance L directly operated by him by means of a control lever J, in the manner required for the braking action desired at the particular time, this being determined in general by reference to a scale or the like, with which the control lever J manipulated by him co-operates. Now it is known that if, after the braking action has started, the speed of the train, and therefore also the speed of slipping between the friction disks of the brakes, diminishes, the frictional value increases, and with it the braking action also. This occurs in jerks shortly before the train comes to a standstill, so that if the pressure compressing the friction disks remains constant, the wheels of the coach would become locked, and in addition the train would come to a standstill with an undesirable jolt. The driver cannot directly prevent this, because in operating his controlling appliance L, he has no means of ascertaining by the feel the nature of the braking action actually produced, which depends not only upon the position of the brake control lever J but also upon the coefficient of friction, which in its turn varies with the rubbing speed. The driver therefore does not know when and to what extent he must adjust the brake lever to a lower braking effect when the speed of travel is diminishing.

This adjusting of the braking action in dependence upon the speed, and also in dependence upon other factors that might affect the coefficient of friction, is automatically effected by the device described, which is illustrated in Figures 6 and 7.

In connection with these figures, it is further pointed out that the controlling device L is in communication through the pipe 92 with a source of compressed air (not shown) and is in communication with the atmosphere through the pipe 93 and through the pipe 84 with the bellows 82, 82 of the controlling device H. The pipe 86 of the controlling device H is connected up to a compressed air reservoir.

The automatic adjusting before mentioned occurs in the following manner: As soon as the brake is switched on by means of the lever J by admitting compressed air to the bellows B, a relative rotation of the members D₃ and D'₃ takes place, with compression of the springs 72. The bellows F are also compressed by the projections 74 and 75. The raised air pressure thereby produced is transmitted by the pipe 76 to the bellows 80, which in their turn displace the control piston 79 against the pressure of its spring 81, and, after traversing a certain displacement distance, during which the passage, supervised by the bore 87, of compressed air from 86 to 91, is at first set completely free, but finally occasions the complete closure of the pipe in question leading to the brake. In this position the adjacent horizontal portions of the bores 88 and 89 also do not register with one another, so that this branch pipe leading to the atmosphere is likewise shut off. Now if the torque in the brake, on account, it may be, of the increase in the coefficient of friction, further increases, the control piston 79 is pressed further down, with the result that the transversely extending portions of the bores 88 and 89 register with one another. The pipe 91 is thereby connected with the atmosphere. The compressed air can escape from the bellows B and relax the braking action. Consequently the springs 72 recover their predominance over the frictional torque, so that the members D₃ and D'₃ are further rotated relatively to one another in the other direction. The bellows F are thereby relieved, the spring 81 can push the control piston 79 back again, so that the passage at 87 is set free again, and compressed air is admitted afresh to the brake, since in the meantime the pipe 88, 89 leading to the atmosphere has been interrupted again. The braking action therefore increases again. This series of operations is repeated until the piston 79 finally comes to rest in an intermediate position. This automatic regulating of the braking torque is independent of the adjustment of the braking action on the part of the train driver, since it occurs in any position of the intermediate piston 78 by which the desired braking action in itself is conditioned. The driver therefore need only adjust the braking action that he considers necessary for the purpose of bringing the train to a standstill at a definite point on the brake lever manipulated by him, which co-operates with a scale of braking action. In each of these adjustments the automatic adaptation of the braking effect concerned to the changing frictional conditions can then take place.

What I claim is:

1. A brake arrangement of the multiple disk type especially for heavy and rapid railway vehicles having running wheels rotatable with respect to the relatively stationary vehicle body comprising: a relatively fast friction disk carrier connected permanently with one of said running wheels of the vehicle, a loose friction disk carrier concentric with said fast carrier and mounted rotatably with respect to said running wheel and the vehicle body, said two carriers being arranged one within the other, a group of a plurality of friction disks mounted on said fast carrier so as to be axially slidable but not rotatable to it, a second group of a plurality of friction disks mounted on said loose carrier so as to be axially slidable but not rotatable relatively to it, the friction disks of the two groups being arranged alternately and forming an axially compressible pile, means for compressing said pile of friction disks in an axial direction, and means for operatively connecting said loose carrier with the vehicle body, said connecting means being adapted to act and to be operated independently of the action of said compressing means, the inner one of said carriers comprising at least one disk body of stepped cross section having an outer flange member and an inner flange member being opposite to said compressing means, said outer flange member bearing on said pile of friction disks.

2. A brake arrangement of the multiple disk type especially for heavy and rapid railway vehicles having running wheels rotatable with respect to the relatively stationary vehicle body comprising: a relatively fast friction disk carrier connected permanently with one of said running wheels of the vehicle, a loose friction disk carrier concentric with said fast carrier and mounted rotatably with respect to said running wheel and the vehicle body, said two carriers being arranged one within the other, a group of a plurality of friction disks mounted on said fast carrier so as to be axially slidable but not rotatable to it, a second group of a plurality of friction disks mounted on said loose carrier so as to be axially slidable but not rotatable relatively to it, the friction disks of the two groups being arranged alternately and forming an axially compressible pile, means for compressing said pile of friction disks in an axial direction and frictionally acting means for connecting said loose carrier with the vehicle body, said connecting means being adapted to act and to be operated independently of the action of said compressing means, said compressing means comprising two groups of bellows arranged opposite to one another in pairs and acting in an axial direction, said frictionally acting connecting means being lodged between said loose friction disk carrier and said vehicle body.

3. A brake arrangement of the class described comprising a relatively stationary vehicle part, a part rotatable with respect to said vehicle part, a fast friction disk carrier connected permanently with one of said vehicle parts, a loose friction disk carrier rotatable with respect to both said vehicle parts, a plurality of friction disks supported by said fast carrier, a plurality of friction disks supported by said loose carrier, the friction disks of the two carriers being arranged alternately and forming an axially compressible pile, fluid pressure applying means for compressing said pile, means for operatively connecting said loose carrier with the other one of said vehicle parts, and means for controlling the action of said compressing means in dependence on the torque produced by the braking.

4. A brake arrangement of the multiple disk type especially for heavy and rapid railway vehicles having running wheels rotatable with respect to the relatively stationary vehicle body comprising: a relatively fast friction disk carrier connected permanently with one of said running wheels of the vehicle, a loose friction disk carrier mounted rotatably with respect to said running wheel and the vehicle body within said fast carrier, a group of a plurality of friction disks mounted on said fast carrier so as to be axially slidable but not rotatable to it, a second group of a plurality of friction disks mounted on said loose carrier so as to be axially slidable but not rotatable relatively to it, the friction disks of the two groups being arranged alternately and forming an axially compressible pile, means for compressing said pile of friction disks in an axial direction, and friction means for connecting said loose carrier with said vehicle body, said connecting means being adapted to act and to be operated independently of the action of said compressing means, the inner one of said carriers comprising at least one disk body of stepped cross section axially displaceable on said inner carrier but not rotatable relatively thereto, said disk body having an outer flange member bearing on said pile of friction disks, and an inner flange member opposite to said compressing means.

5. A brake arrangement of the multiple disk type especially for heavy and rapid railway vehicles having running wheels rotatable with respect to the relatively stationary vehicle body comprising: a relatively fast friction disk carrier connected permanently with one of said running wheels of the vehicle, a loose friction disk carrier within said fast carrier and mounted rotatably with respect to said running wheel and the vehicle body, a group of a plurality of friction disks mounted on said fast carrier so as to be axially slidable but not rotatable to it, a second group of a plurality of friction disks mounted on said loose carrier so as to be axially slidable but not rotatable relatively to it, the friction disks of the two groups being arranged alternately and forming an axially compressible pile, means for compressing said pile of friction disks in an axial direction, and means for rigidly connecting said loose carrier with said vehicle body said connecting means being adapted to act and to be operated independently of the action of said compressing means, the inner one of said carriers comprising at least one disk body of stepped cross section having an outer flange member and an inner flange member being opposite to said compressing means, said outer flange member bearing on said pile of friction disks.

6. A brake arrangement of the multiple disk type especially for heavy and rapid railway vehicles having running wheels rotatable with respect to the relatively stationary vehicle body comprising: a relatively fast friction disk carrier, a loose friction disk carrier concentric with said fast carrier and mounted rotatably with respect to said running wheel and the vehicle body, said two carriers being arranged one within the other, a group of friction disks mounted on said fast carrier so as to be axially slidable but not rotatable to it, a second group of friction disks mounted on said loose carrier so as to be axially slidable but not rotatable relatively to it, the friction disks of the two groups being arranged alternately and forming an axially compressible pile, means for compressing said pile of friction disks in an axial direction, friction means for operatively connecting said loose carrier with said vehicle body, said connecting means being adapted to act and to be operated independently of the action of said compressing means, said running wheel mounted on an axle, an annular cavity provided between said axle and said friction disk pile, and an annular body projecting from said vehicle body in an axial direction into said annular cavity, said compressing means being mounted on said annular body.

7. A brake arrangement for heavy and rapid vehicles, especially railway vehicles, having two vehicle parts adapted to perform a rotating movement relatively to one another, comprising the following parts: a relatively fast friction disk carrier connected permanently with one of said vehicle parts, a loose friction disk carrier mounted rotatably with respect to both said vehicle parts, a group of friction disks mounted on said fast friction disk carrier, a second group of friction disks mounted on said loose friction disk carrier, the friction disks of the two groups being arranged alternately and forming an axially compressible pile, means arranged within said friction disk carriers for compressing said pile in an axial direction, and means for connecting said loose friction disk carrier to the other one of said vehicle parts, an annular body supporting both said compressing means and said connecting means, said annular body having a hub portion and a bore therein, said loose disk carrier having a hub portion extending within said bore close to said axle.

8. A brake arrangement of the class described comprising a relatively stationary vehicle part, a part rotatable with respect to said vehicle part, a fast friction disk carrier connected permanently with one of said vehicle parts, a loose friction disk carrier rotatable with respect to both said vehicle parts, a plurality of friction disks supported by said fast carrier, a plurality of friction disks supported by said loose carrier, the friction disks of the two carriers being arranged alternately and forming an axially compressible pile, hydraulic means for compressing said pile, means for connecting said loose carrier with the other one of said vehicle parts, said connecting means comprising frictional members adapted to slide relatively to one another, said rotatable vehicle part, said loose and fast carriers, said connecting means and said relatively stationary vehicle part forming a kinematic chain interrupted at two places i. e. between the friction disks of the loose carrier and the friction disks of the fast carrier and between said frictional members, a third interruption in said kinematic chain, each of the parts adjacent said third interruption place having abutments, elastic members lodged between two of said abutments so as to allow a limited relative rotation of said adjacent parts, and means for controlling the action of said compressing means and being influenced by said relative rotation.

9. A brake arrangement as claimed in claim 8, the controlling means of which being adapted to control the supply of pressure fluid to said compression means in such a way that with increasing relative rotation of said adjacent parts the pressure in said compression means is reduced.

10. A brake arrangement of the class described comprising a relatively stationary vehicle part, a part rotatable with respect to said vehicle part, a fast friction disk carrier connected permanently with one of said vehicle parts, a loose friction disk carrier rotatable with respect to both said vehicle parts, a plurality of friction disks supported by said fast carrier, a plurality of friction disks supported by said loose carrier, the friction disks of the two carriers being arranged alternately and forming an axially compressible pile, hydraulic means for compressing said pile, means for connecting said loose carrier with the other one of said vehicle parts, said connecting means comprising frictional members adapted to slide relatively to one another, said rotatable vehicle part, said loose and fast carriers, said connecting means and said relatively stationary vehicle part forming a kinematic chain interrupted at two places i. e. between the friction disks of the loose carrier and the friction discs of the fast carrier and between said frictional members, a third interruption in said kinematic chain, each of the parts adjacent said third interruption place having abutments, elastic members lodged between two of said abutments so as to allow limited relative rotation of said adjacent parts, a brake switch and a control member, which is dependent in its position on the one hand upon the extent of said relative rotation and on the other hand upon the position of said brake switch and which supervises the admission of the pressure fluid to sr'd compression means in such a way that this admission in any position of the brake switch upon a predetermined relative rotation of said adjacent parts being exceeded, is throttled or shut off.

11. A brake arrangement as claimed in claim 10 comprising a pipe for the admission of pressure fluid and means to put into communication with the atmosphere said admission pipe upon a predetermined relative rotation of said adjacent parts being exceeded.

HANS KATTWINKEL.